United States Patent
Sato

(10) Patent No.: US 9,251,449 B2
(45) Date of Patent: Feb. 2, 2016

(54) IMAGE FORMING APPARATUS FOR PERFORMING CONTROL OPERATION TO DISCONNECT POWER SUPPLY, POWER MANAGEMENT SYSTEM, IMAGE FORMING METHOD, AND NON-TRANSITORY COMPUTER READABLE MEDIUM

(71) Applicant: FUJI XEROX CO., LTD., Minato-ku, Tokyo (JP)

(72) Inventor: Hideki Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 20 days.

(21) Appl. No.: 13/973,449

(22) Filed: Aug. 22, 2013

(65) Prior Publication Data

US 2014/0253946 A1   Sep. 11, 2014

(30) Foreign Application Priority Data

Mar. 5, 2013   (JP) ................................ 2013-042801

(51) Int. Cl.
G06K 15/02 (2006.01)
G06K 15/00 (2006.01)

(52) U.S. Cl.
CPC ........ *G06K 15/4055* (2013.01); *G06K 15/1805* (2013.01); *G06K 15/408* (2013.01); *G06K 15/005* (2013.01)

(58) Field of Classification Search
USPC ................................................. 358/1.1–1.15
See application file for complete search history.

(56) References Cited

U.S. PATENT DOCUMENTS

| | | | | |
|---|---|---|---|---|
| 6,286,106 | B1* | 9/2001 | Flannery | ........................ 713/310 |
| 8,330,987 | B2* | 12/2012 | Tsukada | ................ G06K 15/00 358/1.15 |
| 2004/0027400 | A1* | 2/2004 | Ryu | ...................... B41J 29/393 347/5 |
| 2004/0218204 | A1* | 11/2004 | Nomura | .................. H04L 67/02 358/1.14 |
| 2004/0258444 | A1* | 12/2004 | Okada | ................ G06K 15/1803 400/76 |
| 2009/0276804 | A1* | 11/2009 | Hamada | ............... G08B 27/008 725/33 |
| 2012/0217697 | A1* | 8/2012 | Schoenmakers | ....... B65H 33/08 271/207 |

FOREIGN PATENT DOCUMENTS

JP             11-341155 A         12/1999

* cited by examiner

*Primary Examiner* — Ngon Nguyen
(74) *Attorney, Agent, or Firm* — Sughrue Mion, PLLC

(57) ABSTRACT

An image forming apparatus includes a printing unit, a disconnect request receiving unit that receives, from a management apparatus which manages power, a disconnect request to disconnect a supply of power, a notification receiving unit that receives a notification of an occurrence of a predetermined event, and a controller that performs a control operation so as to disconnect the supply of power after the printing unit prints predetermined data if the disconnect request receiving unit has received the disconnect request to disconnect the supply of power and the notification receiving unit has received the notification of the occurrence of the predetermined event.

22 Claims, 6 Drawing Sheets

IMAGE FORMING APPARATUS FOR PERFORMING CONTROL OPERATION TO DISCONNECT POWER SUPPLY, POWER MANAGEMENT SYSTEM, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-042801 filed Mar. 5, 2013.

BACKGROUND

Technical Field

The present invention relates to an image forming apparatus, a power management system, an image forming method, and a non-transitory computer readable medium.

SUMMARY

According to an aspect of the invention, there is provided an image forming apparatus. The image forming apparatus includes a printing unit, a disconnect request receiving unit that receives, from a management apparatus which manages power, a disconnect request to disconnect a supply of power, a notification receiving unit that receives a notification of an occurrence of a predetermined event, and a controller that performs a control operation so as to disconnect the supply of power after the printing unit prints predetermined data if the disconnect request receiving unit has received the disconnect request to disconnect the supply of power and the notification receiving unit has received the notification of the occurrence of the predetermined event.

BRIEF DESCRIPTION OF THE DRAWINGS

Exemplary embodiments of the present invention will be described in detail based on the following figures, wherein.

DETAILED DESCRIPTION

An exemplary embodiment of the present invention is described with reference to the drawings.

Figure 1:
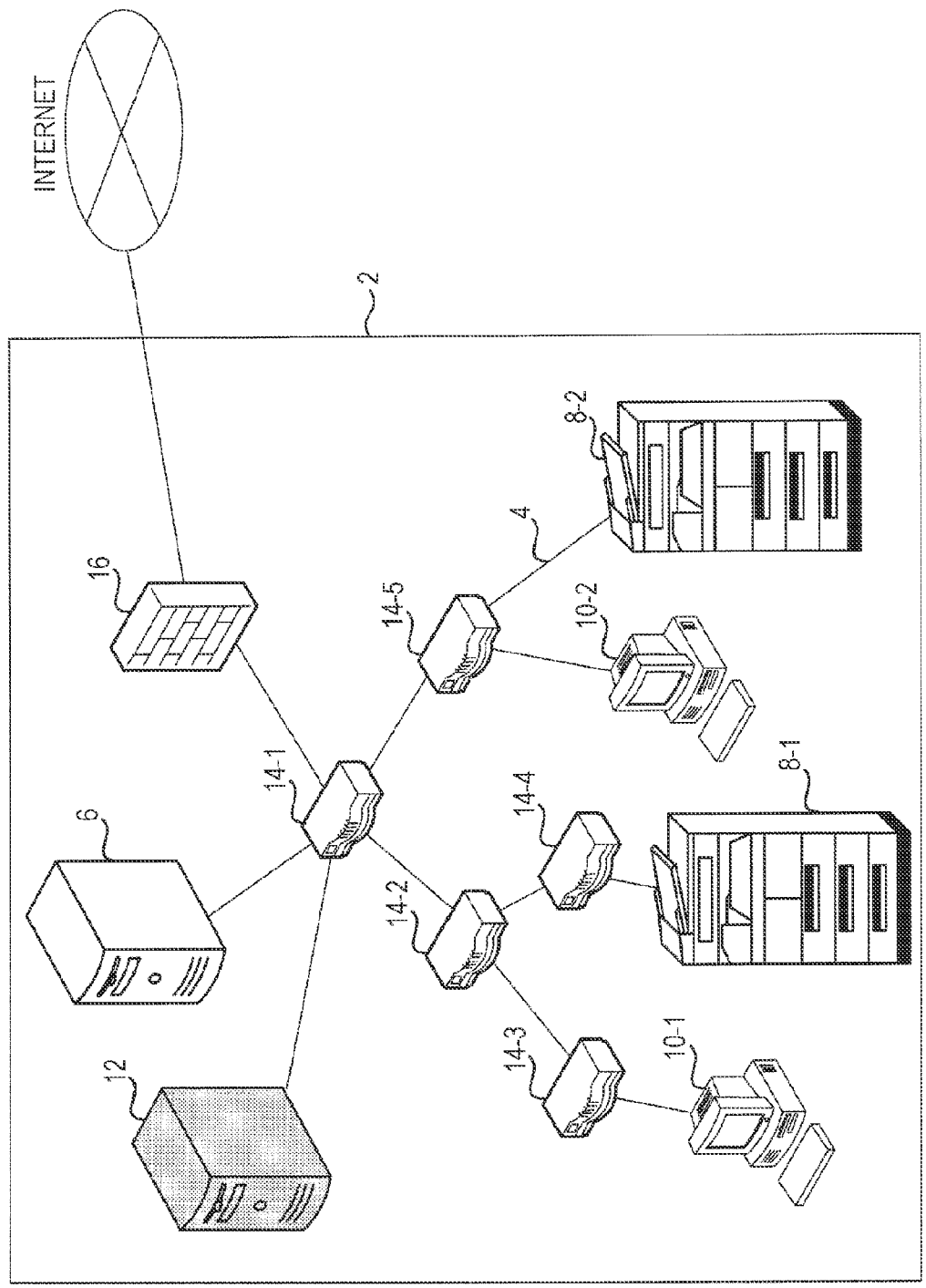
FIG. 1 illustrates a configuration of a power management system of an exemplary embodiment of the present invention.

FIG. 1 is a schematic block diagram illustrating a power management system 2 of an exemplary embodiment of the present invention. As illustrated in FIG. 1, the power management system 2 includes a power management apparatus 6 that manages power of management target apparatuses connected a network 4, such as a local-area network (LAN) or a wide-area network (WAN), and image forming apparatuses 8-1 and 8-2 as the management target apparatuses whose power is managed by the power management apparatus 6. In the discussion that follows, each of the image forming apparatuses 8-1 and 8-2, if described without identifying one from the other, is simply referred to as "an image forming apparatus 8".

As illustrated in FIG. 1, the management target apparatuses may further include image processing apparatuses 10-1 and 10-2 whose power is managed by the power management apparatus 6 in addition to the image forming apparatus 8. In the power management system 2, the power management apparatus 6 is connected to the management target apparatuses via communication devices 14-1 through 14-5, such as a router and a hub. In the exemplary embodiment, the power management apparatus 6 is connected to the Internet via a firewall 16. As described below, the power management system 2 may obtain notification information of an occurrence of an event, such as an emergency earthquake report, via the Internet.

In the exemplary embodiment, the power management system 2 includes a data storage apparatus 12. The data storage apparatus 12 is constructed as a file server, for example, and stores data that is output by the image forming apparatus 8-1 or the image forming apparatus 8-2 if a predetermined event has occurred.

The power management apparatus 6 has a function as a computer, and manages a power supply state of the management target apparatus by transmitting a signal to the management target apparatus.

Figure 2:
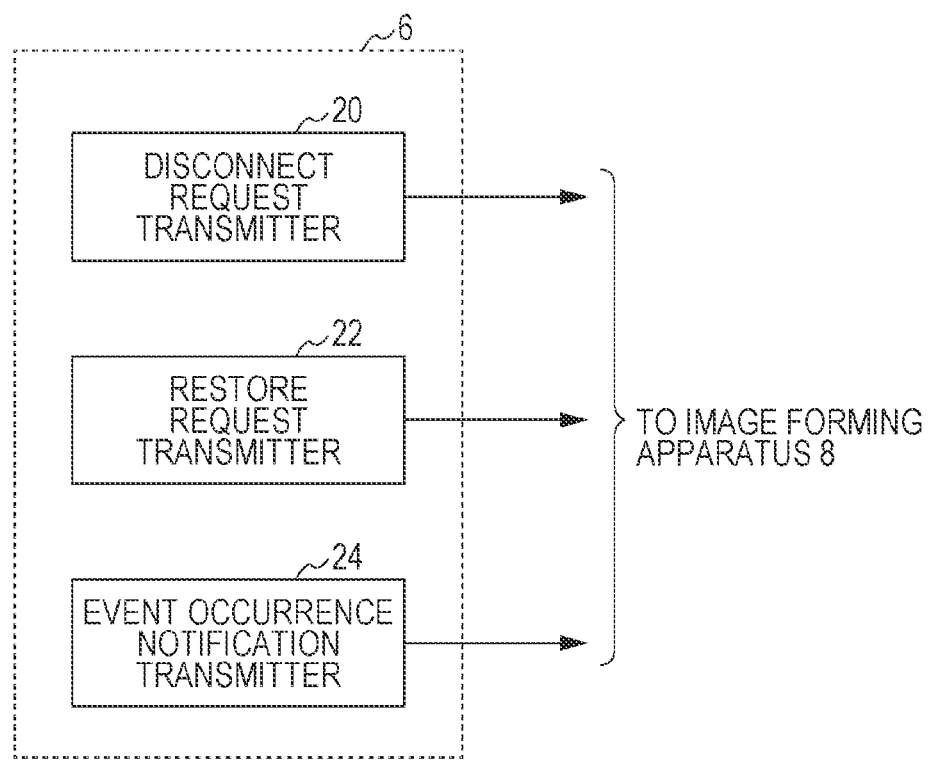
FIG. 2 is a schematic block diagram illustrating a functional configuration example of a power management apparatus that is implemented by executing a program.

FIG. 2 is a schematic block diagram illustrating a functional configuration example of the power management apparatus 6 that is implemented when the power management apparatus 6 executes a program.

The power management apparatus 6 includes a disconnect request transmitter 20, a restore request transmitter 22, and an event occurrence notification transmitter 24.

The disconnect request transmitter 20 transmits a power-off request to the management target apparatus such as the image forming apparatus 8. The power-off request is a signal that requests the management target apparatus to shift from a power supply state prior to the reception of the power-off request to a power supply state that consumes power lower than the power supply state prior to the reception of the power-off request. Upon receiving the signal, the management target apparatus shifts to a pause state or a power disconnect state in which power is disconnected from the management target apparatus.

The restore request transmitter 22 transmit a power restore request to the image forming apparatus 8 as the management target apparatus. The power restore request is a signal that restores the management target apparatus to the power supply state thereof. For example, when the management target apparatus in the pause state receives the power restore request, the management target apparatus shifts to the supply state prior to the reception of the power-off request.

The event occurrence notification transmitter 24 transmits a notification of an occurrence of a predetermined event to the image forming apparatus 8 as the management target apparatus. In the exemplary embodiment, the event occurrence notification transmitter 24 notifies the management target apparatus of the occurrence of an emergency event. The power management apparatus 6 may obtain information about the occurrence of the predetermined event from another apparatus via the Internet, or may include a sensor and detect the occurrence of the predetermined event through the sensor. For example, there may now be an earthquake as an example of an emergency situation. Via the Internet or radiowave, the power management apparatus 6 may obtain information about the occurrence of the earthquake, such as an emergency earthquake report. The power management apparatus 6 may also detect the occurrence of the earthquake through a seismograph arranged therewithin. In one of these ways, the power management apparatus 6 detects the occurrence of the predetermined event and then notifies the management target apparatus of the occurrence of the predetermined event.

When the power management apparatus 6 of the exemplary embodiment verifies the occurrence of the predetermined event, the disconnect request transmitter 20 transmits the power-off request to the image forming apparatus 8, and the event occurrence notification transmitter 24 transmits the notification of the occurrence of the predetermined event to the image forming apparatus 8.

The image forming apparatus 8 is described below.

Figure 3:
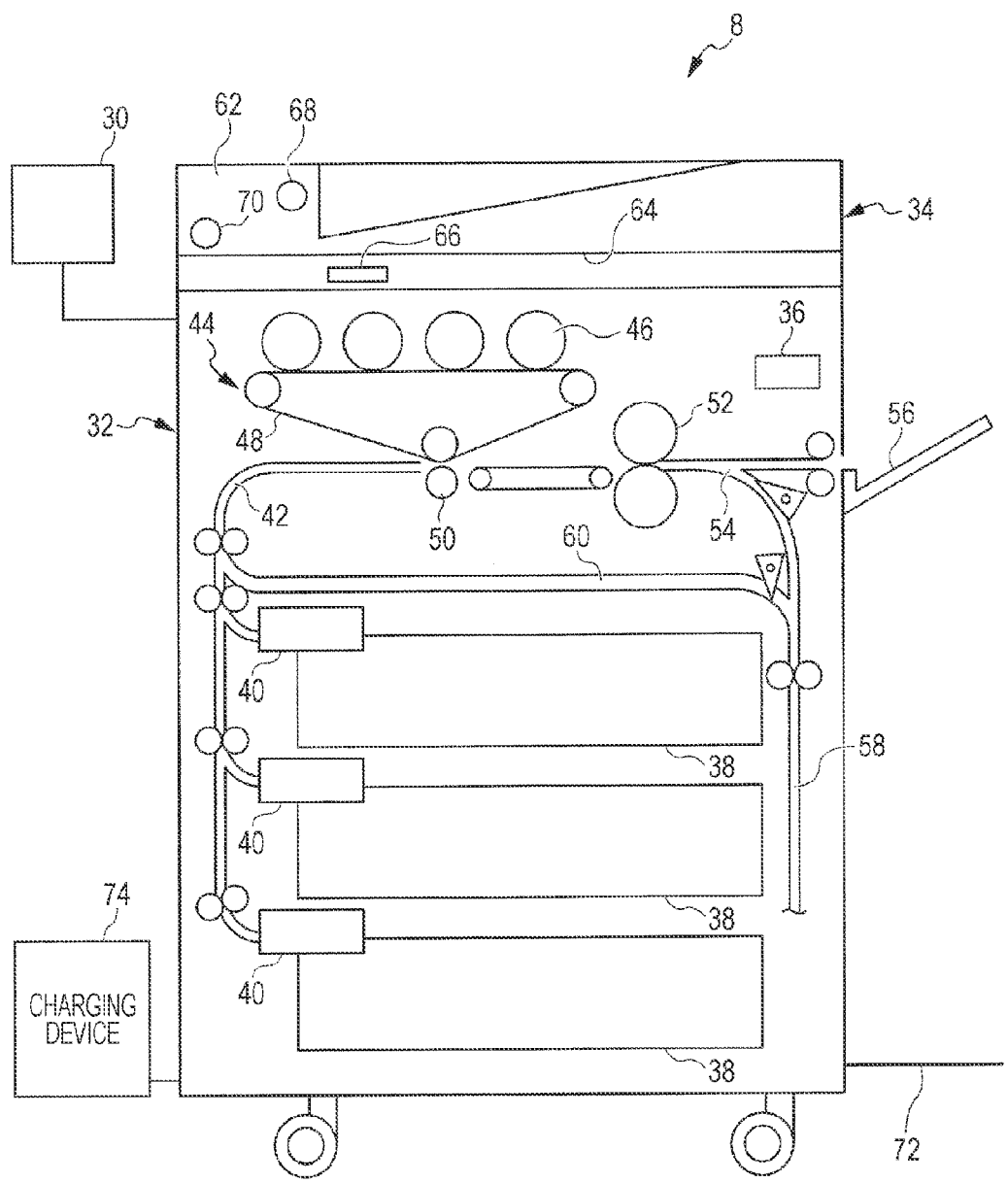
FIG. 3 is a sectional view of an image forming apparatus.

FIG. 3 is a sectional view of the image forming apparatus 8. The image forming apparatus 8 includes an image input and output device 30, a printer 32, a reading device 34, and a communication interface 36.

The image input and output device 30 serves as a display that displays information and an input receiving device that receives an input entered by an operator. In the exemplary embodiment, the image input and output device 30 includes a touchpanel, for example.

The printer 32 performs a printing operation. The printer 32 includes three stacks of recording medium cases 38. Each of the recording medium cases 38 includes a feeder head 40.

If one of the recording medium cases 38 is selected, the feeder head 40 transports a recording medium from the selected recording medium case 38 to an image forming mechanism 44 via a recording medium transport path 42.

The image forming mechanism 44 includes photoconductor drums 46 of yellow, magenta, cyan, and black, and an intermediate transfer belt 48.

Arranged around each photoconductor drum 46 are a charging device, an exposure device, a developing device, a first transfer device, and a cleaning device (these elements are not illustrated). A toner image developed on each photoconductor drum 46 is transferred to the intermediate transfer belt 48. If the printing is set to monochrome, the mechanism for black only is enabled.

The toner image on the intermediate transfer belt 48 is transferred to an incoming recording medium by a second transfer roller 50, and the toner image is then fixed onto the recording medium by a fixing device 52. The recording medium having the toner image fixed thereon is discharged into a discharge unit 56 through a recording medium discharge path 54.

If duplex printing is selected, the recording medium having a surface image-fixed by the fixing device 52 is transported via the recording medium discharge path 54 to a reversing device 58. The recording medium is then reversed by the reversing device 58, transported to a recording reversal path 60, returned back to the recording medium transport path 42, then transported to the image forming mechanism 44 for printing on a reverse side of the recording medium.

The reading device 34 includes an automatic original document reading device 62 that can read both sides of an original document. The automatic original document reading device 62 transports the original document to a platen 64. A reading unit 66 including a charge-coupled device (CCD) reads the image of the original document on the platen 64.

The automatic original document reading device 62 includes an original document setting detector 68 that detects whether the original document is set. The automatic original document reading device 62 also serves as a platen cover.

With the platen cover opened, the original document can be placed on the platen 64. The opening of the platen cover is detected by a platen cover opening detector 70.

The communication interface (I/F) 36 allows the image forming apparatus 8 to communicate with another apparatus, such as the power management apparatus 6 and the data storage apparatus 12 via the network 4. The communication interface 36 may include a data network terminal apparatus, for example. The communication interface 36 may have a function of a modem, and the image forming apparatus 8 may be designed to transmit and receive facsimile communications via a public telephone line.

A power cable 72 is connected to the image forming apparatus 8. The image forming apparatus 8 receives power via the power cable 72, and executes each process thereof. In the exemplary embodiment, the image forming apparatus 8 includes a charging device 74, such as a battery. The image forming apparatus 8 may also be powered from the charging device 74, and may perform the processes thereof. The charging device 74 may be charged up by power supplied via the power cable 72, or may be charged up by power generated by an environment-conscious facility, such as a solar panel.

Figure 4:
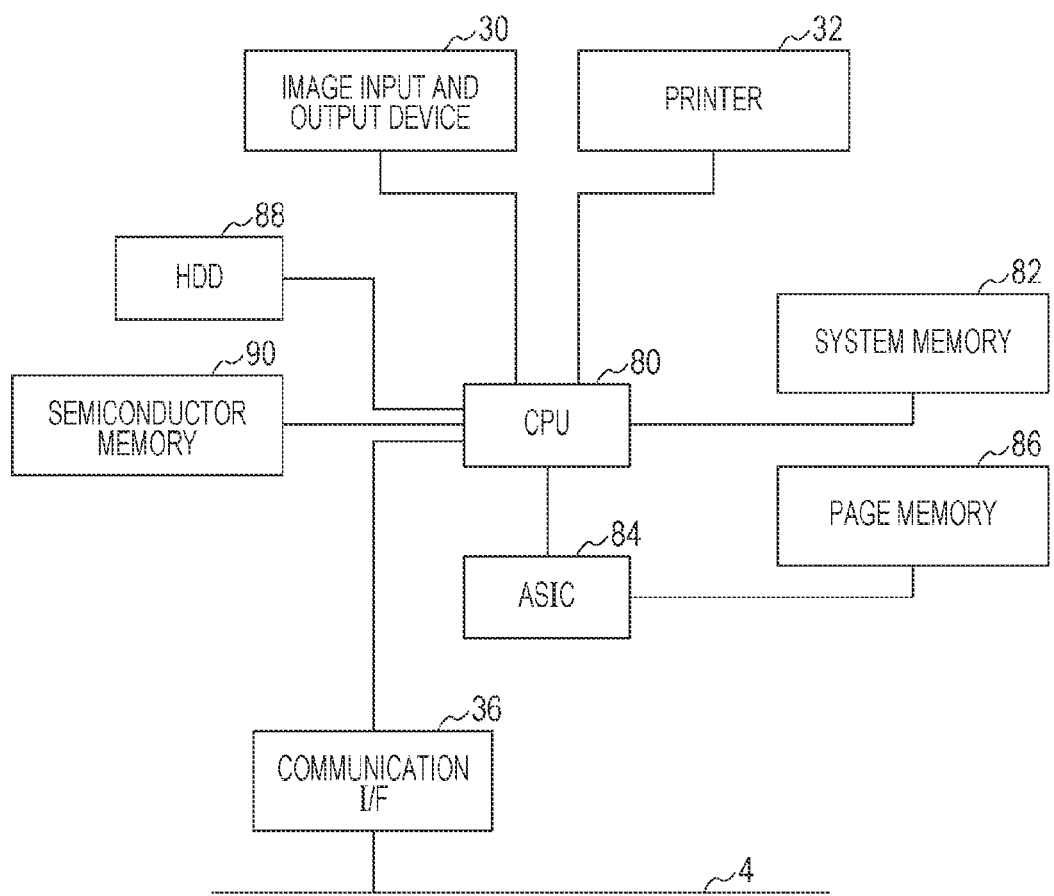
FIG. 4 is a schematic block diagram illustrating a hardware configuration of the image forming apparatus.

FIG. 4 is a hardware configuration diagram illustrating the image forming apparatus 8. As illustrated in FIG. 4, the image forming apparatus 8 includes the image input and output device 30, the printer 32, the communication interface 36 as well as a CPU 80, a system memory 82, an application specific integrated circuit (ASIC) 84, a page memory 86, a hard disk drive (HDD) 88, and a semiconductor memory 90.

The CPU 80 controls the operation of the image forming apparatus 8 by executing a program to be discussed below. The CPU 80 may execute a program stored on a storage medium such as a compact-disk ROM, or a program supplied via a network communication. The system memory 82 stores data and programs that are read or written by the CPU 80, and data received via the communication interface 36. The ASIC 84 is a circuit that performs a process such as image forming. The page memory 86 stores image data that is used in the process of the ASIC 84.

The HDD 88 stores information, including image data and a print job, which are a process target of the image forming apparatus 8 during a period other than the occurrence of the predetermined event. The semiconductor memory 90 is a storage device, such as a secure digital (SD) card, and stores information, including image data and a print job, which are a process target of the image forming apparatus 8 at the occurrence of the predetermined event. In the exemplary embodiment, the semiconductor memory 90 is used. The storage device that stores information as a process target of the image forming apparatus 8 at the occurrence of the predetermined event is not limited to the semiconductor memory 90. The storage device that stores information as a process target of the image forming apparatus 8 at the occurrence of the predetermined event may be a storage device consuming power lower than the storage device that stores the information as the process target of the image forming apparatus 8 during the period other than the occurrence of the predetermined event.

In FIG. 4, the communication interface 36 is connected to the CPU 80. Alternatively, the communication interface 36 may be connected to the ASIC 84.

Figure 5:
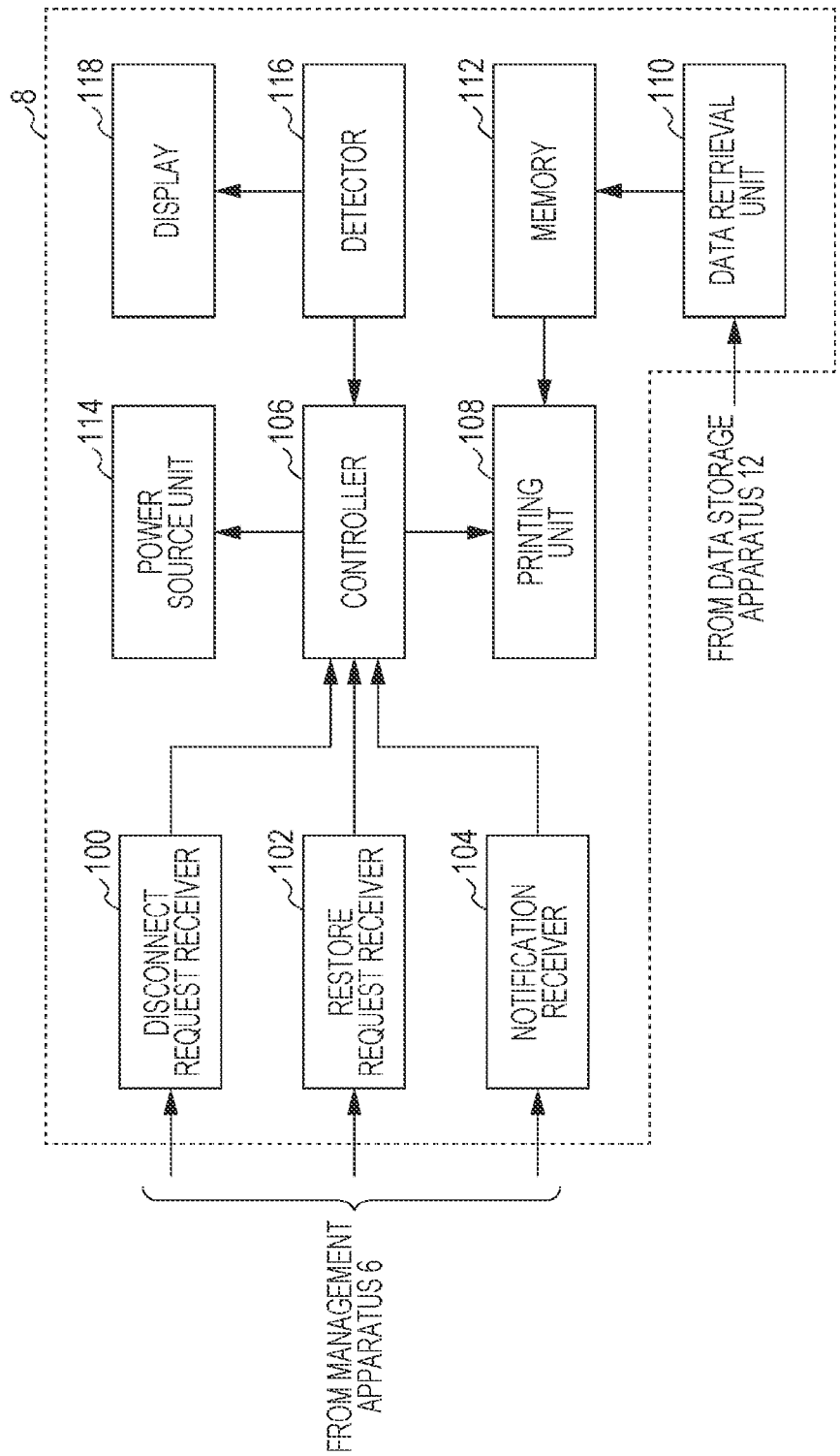
FIG. 5 is a schematic block diagram illustrating a functional configuration of the image forming apparatus that is implemented by executing a program.

FIG. 5 is a schematic block diagram illustrating a functional configuration of the image forming apparatus 8 that is implemented by executing a program.

As illustrated in FIG. 5, the image forming apparatus 8 includes a disconnect request receiver 100, a restore request receiver 102, a notification receiver 104, a controller 106, a printing unit 108, a data retrieval unit 110, a memory 112, a power source unit 114, a detector 116, and a display 118.

The disconnect request receiver 100 receives a power-off request transmitted from the power management apparatus 6, and notifies the controller 106 that the power-off request has been received.

The restore request receiver 102 receives a power restore request transmitted from the power management apparatus 6, and notifies the controller 106 that the power restore request has been received.

The notification receiver 104 receives a notification of the occurrence of a predetermined event. The notification receiver 104 of the exemplary embodiment receives a notification transmitted by the power management apparatus 6 in the discussion of the exemplary embodiment. In another example, the notification receiver 104 may receive information about the occurrence of a predetermined event from an apparatus other than the power management apparatus 6 via the Internet. In yet another example, the image forming apparatus 8 may include a sensor and detect the occurrence of a predetermined event using the sensor.

The controller 106 controls a process of each of the printing unit 108 and the power source unit 114. In the exemplary embodiment, the controller 106 controls the printing unit 108 and the power source unit 114 in accordance with a notification from one of the disconnect request receiver 100, the restore request receiver 102, the notification receiver 104 and the detector 116. The control process of the controller 106 is specifically described below.

The printing unit 108, under the control of the controller 106, performs a print process of a print job stored on the memory 112 using the printer 32. The data retrieval unit 110 retrieves data from the data storage apparatus 12. The data storage apparatus 12 stores data that the image forming apparatus 8 is requested to print when an emergency situation, such as an earthquake, occurs. The data may include information about an emergency communication network, an evacuation center, as well as a map of an evacuation route, and a list of workers on duty. The predetermined data such as this may be data related to a predetermined event, or data that is to be output during the occurrence of the predetermined event.

If the data as a print target stored on the data storage apparatus 12 is updated, the data retrieval unit 110 obtains the updated data, and causes the memory 112 to store the updated data thereon.

The memory 112 stores the data as the print target when the printing unit 108 performs the print process. The memory 112 causes the semiconductor memory 90 to store the data that the data retrieval unit 110 has retrieved from the data storage apparatus 12 and that is requested to be printed when the predetermined event occurs. The memory 112 also stores a printing condition of the data that is requested to be printed when the predetermined event occurs. The printing condition includes the number of printouts, a print format, specification of color printing or monochrome printing, and printing priority order of multiple pieces of data as print targets.

The power source unit 114, under the control of the controller 106, modifies a power supply state to each element of the image forming apparatus 8.

The detector 116 detects whether the recording medium case 38 stores recording media of a count equal to or above the number of prints specified by the printing condition stored on the memory 112. For example, when the recording medium case 38 is replenished with recording media, the detector 116 may memorize a replenish amount. The detector 116 counts the number of recording media consumed in printing, thereby detecting the remaining recording media. A weight sensor (not illustrated) may be arranged in the recording medium case 38, and used to measure the weight of the recording media to calculate the remaining recording media. When the remaining recording media stored in the recording medium case 38 decreases below a predetermined number of prints specified in the printing condition stored on the memory 112, the detector 116 notifies the display 118 and the controller 106 of this decrease.

In response to the notification from the detector 116, the display 118 causes the display of the image input and output device 30 to display an indication that the number of recording media stored in the recording medium case 38 decreases below the predetermined number of prints that is to be requested when the predetermined event occurs. In such a case, the display 118 may display an indication that prompts the user to replenish the recording media. In the exemplary embodiment, the indication is displayed in this way to notify the user of the lack of recording media. Alternatively, the notification may be conveyed using an alarm sound, or a voice, or may be transmitted to another apparatus via the network 4.

The control process of the controller 106 is described in detail below.

When the disconnect request receiver 100 receives the power-off request, the controller 106 instructs the power source unit 114 to shift the power supply state of the image forming apparatus 8 from a power supply state prior to the reception of the power-off request to a power supply state that consumes power lower than the power supply state prior to the reception of the power-off request. However, if the disconnect request receiver 100 has received the power-off request, and the notification receiver 104 has received the notification of the occurrence of the predetermined event, the controller 106 instructs the printing unit 108 to print the predetermined data. After the predetermined data is printed, the controller 106 instructs the power source unit 114 to shift to the power supply state consuming lower power than the power supply state prior to the reception of the power-off request.

If the disconnect request receiver 100 has received the power-off request, and the notification receiver 104 has not received the notification of the occurrence of the predetermined event, the controller 106 instructs the power source unit 114 to shift to a pause state. On the other hand, if the disconnect request receiver 100 has received the power-off request, and the notification receiver 104 has received the notification of the occurrence of the predetermined event, the controller 106 instructs the printing unit 108 to force-end a print job in progress. The controller 106 also instructs the printing unit 108 to print the predetermined data, and instructs the power source unit 114 to shift to a power disconnect state in which all power supplied via the power cable 72 is disconnected. When the predetermined data is printed, the power source unit 114 may disconnect power for a portion of the image forming apparatus 8 other than the remaining portion of the image forming apparatus 8 used for that printing.

In an example of the pause state in the exemplary embodiment, the communication interface 36 is continuously powered so that a signal is received from another apparatus, and power used for functions other than the signal reception is disconnected. In such a case, when the restore request receiver 102 receives a power restore request transmitted by the power management apparatus 6, the controller 106 instructs the power source unit 114 to restore the power supply state prior to the shifting to the pause state.

When the notification has been received from the detector 116, the controller 106 limits the print process prior to the reception of the notification by the notification receiver 104 to control the printing unit 108 so that the recording media are not consumed. This arrangement allows the predetermined data to be printed even in the occurrence of a predetermined event.

Figure 6:
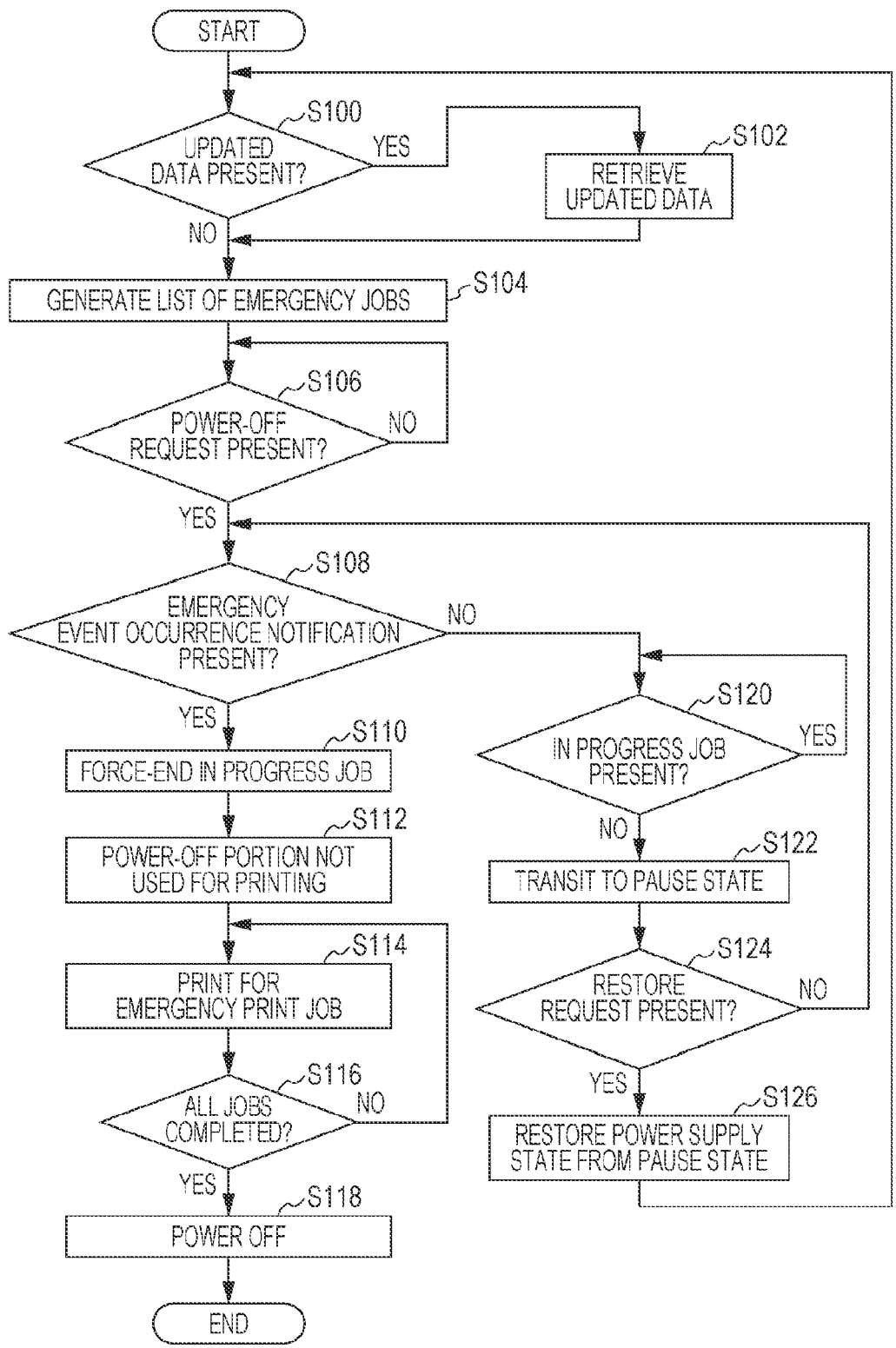
FIG. 6 is a flowchart illustrating an example of an operation of the image forming apparatus.

FIG. 6 is a flowchart illustrating an example of an operation of the image forming apparatus 8.

In step 100 (S100), the data retrieval unit 110 determines whether the data stored on the data storage apparatus 12 has been updated. If updated data is present, processing proceeds to step 102. If no updated data is present, processing proceeds to step 104.

In step 102 (S102), the data retrieval unit 110 retrieves via the network 4 the updated data out of the data stored on the data storage apparatus 12, and then stores the retrieved data onto the memory 112.

In step 104 (S104), the controller 106 generates a print job list to print the data stored on the memory 112 and then stores the print job list on the memory 112. The print job list is used to determine a print priority of a print job having the printing condition specified in advance, and to determine the printing order of the print job.

In step 106 (S106), the controller 106 determines whether the disconnect request receiver 100 has received a power-off request. If a power-off request has been received, processing proceeds to step 108. If no power-off request has been received, the controller 106 waits on standby.

In step 108 (S108), the controller 106 determines whether the notification receiver 104 has received a notification of the occurrence of a predetermined event. If a notification has been received, processing proceeds to step 110. If no notification has been received, processing proceeds to step 120.

In step 110 (S110), the controller 106 instructs the printing unit 108 to force-end a print job in progress.

In step 112 (S112), the controller 106 controls the image forming apparatus 8 so that the image forming apparatus 8 shifts from a power supply state prior to the reception of the notification by the notification receiver 104 to a power supply state that consumes power lower than the power supply state prior to the reception of the notification. More specifically, the power source unit 114 under the control of the controller 106 disconnects power from a portion of the image forming apparatus 8 other than a portion of the image forming apparatus 8 used to print the predetermined data.

In step 114 (S114), the controller 106 instructs the printing unit 108 to print the predetermined data. The printing unit 108 prints the data stored on the memory 112 in accordance with the print job list generated in step 104.

In step 116 (S116), the controller 106 determines whether the printing unit 108 has printed all the print jobs of the print job list generated in step 104. If all the print jobs have been printed, processing proceeds to step 118. If not all the print jobs have been printed, the printing unit 108 prints a next print job in accordance with the priority order specified in the print job list.

In step 118 (S118), the controller 106 instructs the power source unit 114 to shift to a power disconnect state.

If the power-off request has been received, and the notification of the occurrence of the predetermined event has not been received, a standard power management is performed as described below.

In step 120 (S120), the controller 106 waits on standby until a print job in progress has been completed (yes branch from step 120). If a print job in progress has been completed (no branch from step 120), processing proceeds to step 122.

In step 122 (S122), the controller 106 instructs the power source unit 114 to shift to a pause state. The power source unit 114 then causes the image forming apparatus 8 to shift to the pause state.

In step 124 (S124), the controller 106 determines whether the restore request receiver 102 has received a restore request. If no restore request has been received, processing return to step 108. If a restore request has been received, processing proceeds to step 126.

In step 126 (S126), the controller 106 instructs the power source unit 114 to restore the power supply state prior to the shifting to the pause state.

In the exemplary embodiment described above, the printing unit 108 prints the data stored on the semiconductor memory 90 as the memory 112 if the predetermined event has occurred. In one example, data stored on the HDD 88 may be printed. In another example, after the notification of the occurrence of the predetermined event has been received, the predetermined data may be received from another apparatus, such as the data storage apparatus 12, via the network 4 and may then be printed. However, if communications via the network 4 are disabled when the predetermined event occurs, the data stored beforehand on the memory 112 is more reliably printed and thus output.

If the notification receiver 104 has received the notification of the occurrence of the predetermined event, the controller 106 may switch to power from the charging device 74 in order to print the predetermined data.

In the exemplary embodiment described above, the lack of recording media is detected by the detector 116. For example, if the predetermined data is printed, the printing unit 108 may supply the image forming mechanism 44 with the recording media stored on a recording medium case 38 different from a recording medium case 38 that is used to print data other than the predetermined data.

In the exemplary embodiment, the predetermined data is printed out. Alternatively, in conjunction with the printing or in place of the printing, the predetermined data may be facsimile transmitted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:
a printer; and
a controller configured to:
receive, from a management apparatus which manages power, a disconnect request to disconnect a supply of power;
receive a notification of an occurrence of an emergency event; and
perform a control operation so as to force end any print job in progress and disconnect the supply of power after the printer prints predetermined data related to the emergency event in response to receiving the disconnect request to disconnect the supply of power and receiving the notification of the occurrence of the emergency event.

2. The image forming apparatus according to claim 1, further comprising a memory configured to store the predetermined data,
wherein the controller is further configured to perform the control operation so that the printer prints the predetermined data stored on the memory.

3. The image forming apparatus according to claim 2, wherein in response to receiving the disconnect request to disconnect the supply of power and receiving the notification of the occurrence of the emergency event, the controller performs the control operation so that the image forming apparatus shifts from a first power supply state prior to the reception of the notification to a second power supply state that consumes less power than the first power supply state prior to the reception.

4. The image forming apparatus according to claim 2, further comprising a charging device,
wherein the controller is further configured to perform the control operation using power supplied by the charging device so that the printer prints the predetermined data.

5. The image forming apparatus according to claim 3, further comprising a charging device,
wherein the controller is further configured to perform the control operation using power supplied by the charging device so that the printer prints the predetermined data.

6. The image forming apparatus according to claim 2, further comprising a plurality of recording medium cases configured to store recording media,
wherein in response to the predetermined data being printed, the printer prints the predetermined data onto a recording medium stored on a recording medium case different from a recording medium case which is used when data other than the predetermined data is printed.

7. The image forming apparatus according to claim 2, wherein the memory is further configured to store a printing condition of the predetermined data, and
wherein the controller is further configured to perform the control operation so that the printer prints the predetermined data in accordance with the printing condition stored on the memory.

8. The image forming apparatus according to claim 7, wherein in response to receiving the disconnect request to disconnect the supply of power and receiving the notification of the occurrence of the emergency event, the controller performs the control operation so that the image forming apparatus shifts from a first power supply state prior to the reception of the notification to a second power supply state that consumes less power than the first power supply state prior to the reception of the notification.

9. The image forming apparatus according to claim 8, further comprising a charging device,
wherein the controller is further configured to perform the control operation using power supplied by the charging device so that the printer prints the predetermined data.

10. The image forming apparatus according to claim 7, further comprising a charging device,
wherein the controller is further configured to perform the control operation using power supplied by the charging device so that the printer prints the predetermined data.

11. The image forming apparatus according to claim 7, further comprising a plurality of recording medium cases configured to store recording media,
wherein in response to the predetermined data being printed, the printer prints the predetermined data onto a recording medium stored on a recording medium case different from a recording medium case which is used when data other than the predetermined data is printed.

12. The image forming apparatus according to claim 7, further comprising:
a recording medium case configured to store a recording medium; and
a detector configured to detect whether the recording medium case stores the recording media of a count equal to or above a number of printouts specified by the printing condition stored on the memory.

13. The image forming apparatus according to claim 1, wherein in response to receiving the disconnect request to disconnect the supply of power and receiving the notification of the occurrence of the emergency event, the controller performs the control operation so that the image forming apparatus shifts from a first power supply state prior to the reception of the notification to a second power supply state that consumes less power that the first power supply state prior to the reception of the notification.

14. The image forming apparatus according to claim 13, further comprising a charging device,
wherein the controller is further configured to perform the control operation using power supplied by the charging device so that the printer prints the predetermined data.

15. The image forming apparatus according to claim 13, further comprising a plurality of recording medium cases configured to store recording media,
wherein in response to the predetermined data being printed, the printer prints the predetermined data onto a recording medium stored on a recording medium case different from a recording medium case which is used when data other than the predetermined data is printed.

16. The image forming apparatus according to claim 1, further comprising a charging device,
wherein the controller is further configured to perform the control operation using power supplied by the charging device so that the printer prints the predetermined data.

17. The image forming apparatus according to claim 1, further comprising a plurality of recording medium cases configured to store recording media,
wherein in response to the predetermined data being printed, the printer prints the predetermined data onto a recording medium stored on a recording medium case different from a recording medium case which is used when data other than the predetermined data is printed.

18. The image forming apparatus according to claim 1, wherein the predetermined data is associated with the emergency event.

19. A power management system comprising an image forming apparatus and a management apparatus configured to manage power,
wherein the management apparatus comprises:
a transmitter configured to transmit a disconnect request to disconnect a supply of power, and to transmit a notification of an occurrence of an emergency event, and
wherein the image forming apparatus comprises:
a printer; and
a controller configured to:
receive the disconnect request to disconnect the supply of power;
receive a notification of the occurrence of the emergency event; and
preform a control operation so as to force end any print job in progress and disconnect the supply of power after the printer prints predetermined data related to the emergency event in response to receiving the disconnect request to disconnect the supply of power and receiving the notification of the occurrence of the emergency event.

20. An image forming method of an image forming apparatus, comprising:
receiving, from a management apparatus that manages power, a disconnect request to disconnect a supply of power;
receiving a notification of an occurrence of an emergency event; and
performing a control operation to force end any print job in progress and disconnect the supply of power subsequent to printing of predetermined data related to the emergency event in response to the disconnect request being received and the notification of the occurrence of the emergency event being received.

21. A non-transitory computer readable medium storing a program causing a computer to execute a process for forming an image on an image forming apparatus, the process comprising:
receiving, from a management apparatus that manages power, a disconnect request to disconnect a supply of power;
receiving a notification of an occurrence of an emergency event; and
performing a control operation to force end any print job in progress and disconnect the supply of power subsequent to printing of predetermined data related to the emergency event in response to the disconnect request being received and the notification of the occurrence of the emergency event being received.

22. An image forming apparatus, comprising:
a printer configured to print data received from a source of print data; and
a controller configured to:
receive, from a management apparatus which manages power, a disconnect request to disconnect a supply of power;
receive a notification of an occurrence of an event that is unrelated to the printer and the source of print data; and
perform a control operation so as to force end any print job in progress and disconnect the supply of power after the printer prints predetermined data related to the emergency event in response to receiving the disconnect request to disconnect the supply of power and receiving the notification of the occurrence of the event.

* * * * *